United States Patent [19]

Lang

[11] Patent Number: 6,018,995

[45] Date of Patent: Feb. 1, 2000

[54] OSCILLATING PISTON FLOWMETER

[75] Inventor: Gerhard Lang, Birkenheide, Germany

[73] Assignee: Spanner-Pollux GmbH, Ludwigshafen, Germany

[21] Appl. No.: 09/016,035

[22] Filed: Jan. 30, 1998

[30] Foreign Application Priority Data

Aug. 1, 1997 [DE] Germany .................. 297 13 705 U

[51] Int. Cl.$^7$ .................. G01F 3/08; F01C 1/02
[52] U.S. Cl. .................. 73/257; 418/64; 418/57
[58] Field of Search .................. 73/252, 253, 257, 73/239; 418/64, 57, 56

[56] References Cited

U.S. PATENT DOCUMENTS

| | | |
|---|---|---|
| 1,999,684 | 4/1935 | Bradley . |
| 2,338,152 | 1/1944 | Whittaker .................. 418/64 |
| 2,460,617 | 2/1949 | Balogh .................. 418/57 |
| 2,487,783 | 11/1949 | Bergman .................. 73/257 |
| 2,566,220 | 8/1951 | Lindley et al. .................. 73/257 |
| 2,857,763 | 10/1958 | Hague et al. .................. 73/257 |

FOREIGN PATENT DOCUMENTS 2703549  8/1978  Germany .

*Primary Examiner*—Harshad Patel
*Attorney, Agent, or Firm*—Brown & Wood, LLP

[57] ABSTRACT

An oscillating flowmeter including a measuring chamber having a bottom, a cylindrical jacket, a central journal, a guide ring, a separating wall, and inlet and outlet openings, and a piston located in the measuring chamber and having a bottom, a cylindrical skirt, at least one pilot journal engageable with and rotatable about the central journal of the measuring chamber, and a guiding slot extending in the skirt and the bottom and up to separating wall of the measuring chamber, with at least one of the central journal of the measuring chamber and the pilot journal of the piston being formed as a resiliently pliable member.

2 Claims, 1 Drawing Sheet

OSCILLATING PISTON FLOWMETER

BACKGROUND OF THE INVENTION

1. Field of the Invention

The present invention relates to an oscillating piston flowmeter including a measuring chamber having a bottom, a cylindrical jacket, a central journal, a guide ring, a separating wall, and inlet and outlet openings; and a piston located in the measuring chamber and having a bottom, a cylindrical skirt, a pilot journal engageable with and rotatable about the central journal of the measuring chamber, and a guiding slot extending in the skirt and the bottom and up to separating wall of the measuring chamber.

2. Description of the Prior Art

Oscillating piston flowmeters, which relate to volumetric flowmeters, include a measuring chamber through which an entire amount of a liquid flows. At that, a portion of the potential energy of the to-be-measured water, which energy is used for driving the flowmeter, becomes lost. The resulting pressure drop is indicated as pressure loss P. The pressure drop is caused by a change of direction of water flow, a change of a cross-section of the water conduit along the path of water flow, etc.

There is arranged in the measuring chamber an oscillating piston which is displaced during the measuring process from a high pressure side to the low pressure side. This takes place automatically under the action of the water flow which regularly splits in the measuring chamber in a plurality of streams. Upon rotation of the piston, two different volumes of constant predetermined magnitudes are conveyed. At that, the lower pilot journal of the piston rotates about the central journal of the measuring chamber.

The piston skirt has a slot along its entire height. Upon rotation of the piston, this slot reciprocates along the separating wall which is provided in the measuring chamber. The advantage of the reciprocating movement consists in that the piston automatically returns in its initial position without any need in additional control devices, valves, slides, etc. Inner and outer piston guide means insure the necessary movement of the piston. The piston is also provided with an upper journal which drives a driver which transmits the circular movement of the upper journal to a counter.

The measurement precision of oscillating piston flowmeter to a large extent depends on the dimensional accuracy of the elements of the measuring chamber. The smaller is the clearance between the piston and the measuring chamber the less amount of liquid can pass unnoticed, and the smaller is the measurement error. However, from a functional point of view, a minimal clearance between the piston and the measuring chamber is needed to prevent the piston from jamming. A typical magnitude of the clearance between movable parts is smaller of or equal to 10 $\mu$m. Often, the to-be-measured liquid contains dirt particles, e.g., rust, sand and the like, in case of drinking water. Often different salts precipitate from a liquid, e.g., lime in case of the drinking water. As a rule, these foreign substances pass past the piston without problems. However, now and then it may occur that these particles accumulate in the functional clearance between the piston and the wall of the measuring chamber.

When these particles are loose, they are pushed by the piston to the measuring chamber, without causing any trouble. At that, the movement of the piston slightly slows down, without noticeably affecting the measurement accuracy.

However, when the particles stuck in the clearance, they can block the movement of the piston, and the flowmeter fails.

Further, there exists a possibility of the piston being rubbed by the particles. This may result in formation of scratches in the walls of the piston and/or the measuring chamber, which increase the actual clearance between the piston and the wall of the measuring chamber. This does not result in a failure of the flow-meter, but its measurement accuracy is reduced.

Accordingly an object of the present invention is to provide an oscillating piston of the above-described type in which the blocking of the piston movement is prevented and a possibility of a damage the walls of the piston and the measuring chamber is substantially reduced.

SUMMARY OF THE INVENTION

This and other objects of the present invention, which will become apparent hereinafter, are achieved by forming at least one of the central journal of the measuring chamber and the piston pilot journal resiliently pliable.

The present invention permits a temporary lift of the piston of the wall of the measuring chamber, which prevents the piston from being blocked in its movement and, in majority of cases, scratching of the walls of the piston and/or the measuring chamber. Even under most unfavorable circumstances, the measurement accuracy is affected only for a very short period. A further advantage of the oscillating piston flowmeter according to the present invention consists in that its operational service life is increased. It is well known that the central journal of the measuring chamber and the pilot journal of the oscillating piston are subjected during operation of the flow-meter to a substantial wear, which leads to a non-uniform spitting of the liquid flow and to its non-uniform discharge. Due to resilient or elastic pliability of the journals, periodically occurring forces, which results from a non-uniform flow, are elastically absorbed and cushioned.

In accordance with advantageous embodiment of the present invention, the central journal and/or resilient journal are formed as a thin-wall cylinder.

The resiliently deformable or pliable journals are advantageously formed of a viscoplastic material.

DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
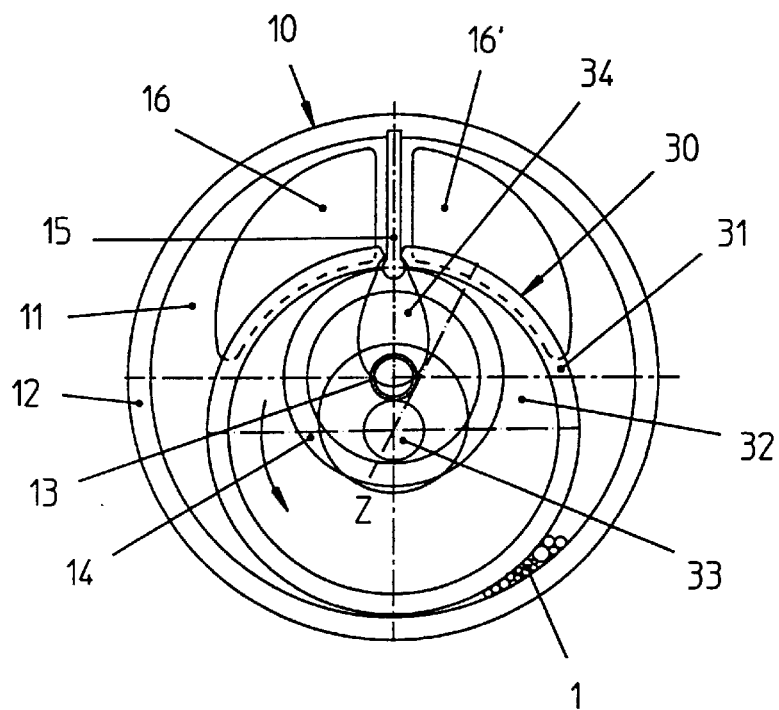
FIG. 1 shows a plan view of a conventional oscillating piston flowmeter with the cover of the measuring chamber being removed.

FIG. 1 shows a plan view of an oscillating piston flowmeter with elements necessary for explaining the present invention. The oscillating piston flowmeter shown in FIG. 1 has a measuring chamber 10 with a bottom 11, a cylindrical measuring chamber jacket 12, a central journal 13, a guide ring 14, and a radial separating wall 15. On the left from the separating wall 15, there is a sickle-shaped inlet opening 16, and on the right from the separating wall 15, there is a likewise sickle-shaped outlet opening 16' for the measured water.

Inside of the measuring chamber 10, there is provided an oscillating piston 30 having a cylindrical piston skirt 31, a piston bottom 32 and a pilot journal 33. The pilot journal 33 moves along a circle about the central journal 13.

A radial slot 34 is formed in the piston skirt 31 and the piston bottom 32. The slot 34 permits to pin the oscillating piston 30 on the separating wall 15. The rectilinear formed by the separating wall 15, and a circular guide, which is defined by a combination of the guide ring 14 and the central journal 13, provide for the oscillating movement of the piston 30, as is known.

Figure 2:
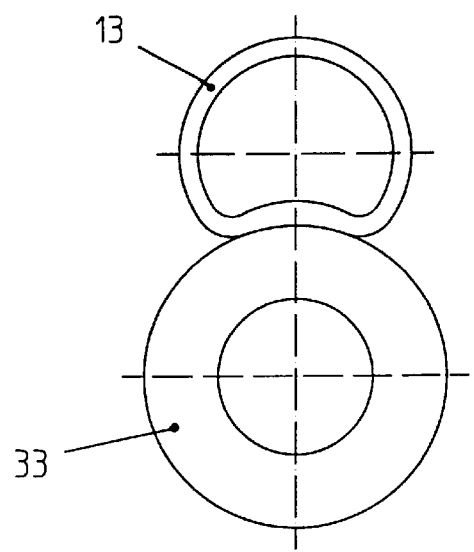
FIG. 2 shows a cut-out view of the oscillating piston flowmeter shown in FIG. 1 at an increased scale, illustrating the present invention.

When dirt particles 1 are caught in a narrow functional clearance between the jacket 12 of the measuring chamber 10 and the piston skirt 31, they adversely affect the movement of the oscillating piston 30 until they completely block it. To prevent such blocking, the central journal 13 is formed resiliently pliable. As shown in FIG. 2 at an increased scale, the central journal is formed as a thin-wall cylinder of a viscoplastic material. As a result, the central journal can be elastically deformed, with the oscillating piston 30 evading the dirt particles when yielding laterally. The evasion is also insured when the piston journal 33 is formed resiliently pliable.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An oscillating flowmeter, comprising:

a measuring chamber having a bottom, a cylindrical jacket, a central journal a guide ring, a separating wall, an inlet and outlet openings; and a piston located in the measuring chamber and having a bottom, a cylindrical skirt, a pilot journal engageable with and rotatable about the central journal of the measuring chamber, and a guiding slot extending in the skirt and the bottom and up to separating wall of the measuring chamber, wherein at least one of the central journal of the measuring chamber and the pilot journal of the piston is formed as a resiliently pliable thin-wall cylinder.

2. An oscillating piston flowmeter as set forth in claim 1, wherein the at least one of the central journal and the pilot journal is formed of a viscoplastic material.

* * * * *